(12) United States Patent
Roth (10) Patent No.: US 8,926,030 B2
(45) Date of Patent: Jan. 6, 2015

(54) ELECTRICAL SWITCHGEAR CABINET

(75) Inventor: Michael Roth, Sasbach (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 13/228,193

(22) Filed: Sep. 8, 2011

(65) Prior Publication Data

US 2012/0055924 A1    Mar. 8, 2012

(30) Foreign Application Priority Data

Sep. 8, 2010   (DE) .......................... 10 2010 044 761

(51) Int. Cl.
*H05K 5/00* (2006.01)
*H02B 1/01* (2006.01)
*H02B 1/30* (2006.01)

(52) U.S. Cl.
CPC *H02B 1/01* (2013.01); *H02B 1/014* (2013.01); *H02B 1/308* (2013.01)
USPC .......................... 312/223.2; 312/111; 312/140

(58) Field of Classification Search
USPC ........... 312/111, 107, 140, 198, 257.1, 265.5, 312/223.2, 223.3; 361/641, 644, 645, 651, 361/652, 658, 746, 797, 802–804; 403/292
See application file for complete search history.

(56) References Cited

U.S. PATENT DOCUMENTS

| | | | | |
|---|---|---|---|---|
| 1,076,116 A | * | 10/1913 | Hatfield | 312/111 |
| 2,790,691 A | * | 4/1957 | Goebel | 312/111 |
| 3,178,296 A | * | 4/1965 | Minsk et al. | 430/628 |
| 3,836,217 A | * | 9/1974 | Shiina | 312/107 |
| 3,836,218 A | * | 9/1974 | Hallal | 312/111 |
| 4,123,129 A | * | 10/1978 | Butler | 312/265.3 |
| 4,473,315 A | * | 9/1984 | Latchinian | 403/172 |
| 4,667,966 A | | 5/1987 | Oehrle et al. | |
| 5,039,177 A | * | 8/1991 | Newell et al. | 312/111 |
| 5,066,161 A | * | 11/1991 | Pinney | 403/172 |

(Continued)

FOREIGN PATENT DOCUMENTS

| | | |
|---|---|---|
| DE | 102006014439 A1 | 10/2007 |
| DE | 102009007049 A1 | 8/2010 |
| WO | 2010086145 A1 | 8/2010 |

OTHER PUBLICATIONS

Office Action issued Oct. 19, 2012 in related U.S. Appl. No. 13/228,124.

(Continued)

*Primary Examiner* — Daniel Rohrhoff
(74) *Attorney, Agent, or Firm* — Buchanan Ingersoll & Rooney PC (57) ABSTRACT

An electrical switchgear cabinet is includes two side wall parts and a respective cover and base wall part. The wall parts are in each case integrally connected to one another, and form a rectangular frame which can be connected to a rear face and to a front face. Each side wall part and each cover or base wall part is angled along its outer edges so as to form a box-like shape. The angled edges are integrally connected to one another at the abutment points with adjacent angled outer edges and form a corner profile at each frame corner. As a result, it is possible for a connecting profile to be connected to the corner profile in each case. A switchgear cabinet connecting profile of the abovementioned type for connecting at least two switchgear cabinets (e.g., in a force-fitting manner) is also provided.

30 Claims, 3 Drawing Sheets

(56) References Cited

U.S. PATENT DOCUMENTS

| | | | |
|---|---|---|---|
| 5,498,073 A * | 3/1996 | Charbonneau et al. | 312/257.1 |
| 5,775,051 A | 7/1998 | Nicolai et al. | |
| 5,806,946 A * | 9/1998 | Benner et al. | 312/265.3 |
| 5,813,791 A * | 9/1998 | Kubota | 403/294 |
| 6,312,068 B1 * | 11/2001 | Benner et al. | 312/111 |
| 6,899,404 B1 * | 5/2005 | King | 312/111 |
| 6,913,333 B2 | 7/2005 | Holighaus et al. | |
| 6,962,373 B2 | 11/2005 | Houghton | |
| 6,965,075 B2 * | 11/2005 | Suzuki | 174/50 |
| 7,090,226 B1 | 8/2006 | Trainor et al. | |
| 7,314,258 B2 | 1/2008 | Sakanoue | |
| 7,992,417 B2 * | 8/2011 | Hayashi | 72/208 |
| 8,083,301 B2 * | 12/2011 | Hudz et al. | 312/265.4 |
| 2003/0173875 A1 * | 9/2003 | Saravis | 312/111 |
| 2004/0007951 A1 | 1/2004 | Holighaus et al. | |
| 2005/0104303 A1 | 5/2005 | Kojima et al. | |
| 2008/0272677 A1 * | 11/2008 | Francisquini | 312/257.1 |
| 2009/0284109 A1 * | 11/2009 | Lee | 312/223.2 |
| 2011/0241505 A1 * | 10/2011 | Tashjian | 312/198 |
| 2012/0055923 A1 | 3/2012 | Roth | |

OTHER PUBLICATIONS

Office Action, issued Jul. 5, 2013, in related U.S. Appl. No. 13/228,124.

Office Action issued on Jul. 17, 2014, by the U.S. Patent and Trademark Office in co-pending U.S. Appl. No. 13/228,124.

* cited by examiner

ELECTRICAL SWITCHGEAR CABINET

RELATED APPLICATION

This application claims priority under 35 U.S.C. §119 to German Patent Application No. 10 2010 044 761.7 filed in Germany on Sep. 8, 2010, the entire content of which is hereby incorporated by reference in its entirety.

FIELD

The present disclosure relates to an electrical switchgear cabinet having a respective cover, a base wall part and two side wall parts, in which the wall parts are in each case integrally connected to one another and form a rectangular frame. The present disclosure also relates to a switchgear cabinet connecting profile for connecting at least two switchgear cabinets in a force-fitting manner.

BACKGROUND INFORMATION

It is known that electrical switchgear cabinets are usually in the form of wall cabinets and are intended to accommodate electrical switchgear and electrical fuses and the like.

Electrical switchgear cabinets are often recessed in the wall and provided with a front face which terminates flush with the wall. In other cases, the electrical switchgear cabinets are arranged on the wall surface.

However, in most cases, such as when the switchgear cabinet is intended for the residential sector, the user of the switchgear cabinet places a great deal of importance on the switchgear cabinet having an attractive exterior, and therefore the electrical switchgear cabinet itself and its technical provisions should, as far as possible, not be visible.

To this end, the front face of the wall cabinet in question is, for example, covered by a pivotably arranged picture or mirror or by other design elements in order to thus disguise the actual intended use of the item of furniture in question.

However, even when such electrical switchgear cabinets are used in offices or in industrial installations, the operator places importance on appropriate appearance, that is to say the switchgear cabinet is identifiable as such but should nevertheless be visually appealing.

SUMMARY

An exemplary embodiment of the present disclosure provides an electrical switchgear cabinet. The exemplary switchgear cabinet includes two side wall parts, and at least one of a cover wall part and a base wall part. The side wall parts and the at least one of the cover wall part and base wall part are connected to one another, and form a rectangular frame which is configured to be connected to a rear face and to a front face. Each side wall part and each at least one of the cover wall part and base wall part is angled along its outer edges so as to form a box-like shape. The angled edges are integrally connected to one another at abutment points with adjacent angled outer edges and form a corner profile at each frame corner, such that a connecting profile is connectable to the corner profile.

An exemplary embodiment of the present disclosure provides a switchgear cabinet connecting profile for connecting at least two switchgear cabinets in a force-fitting manner. The connecting profile is of a multi-part design and includes a core profile, and at least one of a covering profile and a retaining profile. The connecting profile also includes at least one cap which can be fitted to a profile end. The core profile is configured to anchor to one of a frame and to a frame corner of a respective one of the at least two switchgear cabinets. The at least one of the covering profile and the retaining profile is configured to connect two core profiles, and the at least two switchgear cabinets, in a force-fitting manner.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide an electrical switchgear cabinet having a respective cover, a base wall part and two side wall parts, in which the wall parts are in each case integrally connected (e.g., welded) to one another and form a rectangular frame which can be connected to a rear face and to a front face. The exemplary electrical switchgear cabinet of the present disclosure can be manufactured in an expedient manner and can be used in a versatile manner, with the exterior of the electrical switchgear cabinet having a visually appealing design.

Exemplary embodiments of the present disclosure also provide a switchgear cabinet connecting profile for connecting at least two switchgear cabinets in a force-fitting manner.

In accordance with an exemplary embodiment of the present disclosure, each side wall part and each cover or base wall part can be angled along its outer edges so as to form a box-like shape, for the angled edges to be, for example, integrally, connected to one another at the abutment points with adjacent angled outer edges and to form a corner profile at each frame corner. Accordingly, exemplary embodiments of the present disclosure provide a connecting profile to be connected to the corner profile in each case.

In accordance with an exemplary embodiment of the present disclosure, the respectively abutting edges of each side wall part and of each cover or base wall part which adjoins the side wall part and for the connections between the wall parts can be produced by means of welding (e.g., laser welding). In this case, the edges or wall parts which are to be connected to one another can be first tacked and then the welded connection is established.

According to an exemplary embodiment of the present disclosure, the connecting profile, which is arranged at each frame corner which is in each case formed by a side wall part with a cover wall part or with a base wall part, forms an at least visual connection with the corresponding adjacent wall parts of the frame corner in such a way that the angular step which is present at each frame corner is filled by the connecting profile so as to terminate flush.

In accordance with an exemplary embodiment of the electrical switchgear cabinet according to the present disclosure, the connecting profile, which is intended to be mounted in the corner profile, can be of a multi-part design.

Accordingly, provision is made for the connecting profile or the switchgear cabinet connecting profile to be formed by a core profile, a covering profile or a retaining profile, and at least one cap which can be fitted at a profile end. In this case, the core profile is intended to be anchored to the frame or to the frame corner, while the covering profile and cap, which can be fitted at the profile end, enhance the external appearance and also serve as a design feature.

In accordance with an exemplary embodiment of the present disclosure, the core profile of each connecting profile can be of an identical design, that is to say all core profiles for the class of the electrical switchgear cabinet according to an exemplary embodiment of the present disclosure are identical and accordingly can be used in a universal manner in all corresponding switchgear cabinets.

According to an exemplary embodiment of the present disclosure, the core profile is of a partially open design, with the cross section of the core profile having the basic shape of a square with rounded corners, one corner from amongst the corners and flanks which adjoin the one corner being removed in each case at least as far as to half the edge length of the square. In other words, the square is open in this case and accordingly the core profile is also open along its longitudinal axis.

When the core profile is installed in the corner profile of the frame in question, provision is made for the open corner of the core profile to point outwards in the direction of the diagonal of the frame; that is, the open region forms the corner termination of the frame which is provided with the corner profile.

According to an exemplary embodiment of the present disclosure, provision is made for the covering or retaining profile to be able to be mounted on the core profile; that is, the covering or retaining profile can be connected to the core profile in an interlocking and possibly force-fitting manner by means of sliding, attachment or plugging or clipping, for example, with the covering or retaining profile in its intended installation position, terminating flush with the surface of the respective side wall part or cover or base wall part.

According to an exemplary embodiment of the present disclosure, each covering profile has two longitudinal edges which run in the longitudinal direction and are arranged orthogonally relative to one another. A connecting web which runs in the longitudinal direction adjoins the longitudinal edges in each case at an angle of less than about 90° and in this way forms an angular profile. Two retaining grooves which run in the longitudinal direction are integrally formed on the inner face of the angular profile. In accordance with an exemplary embodiment of the present disclosure, the covering profile can therefore determine the outer contour of any switchgear cabinet which is formed according to the present disclosure.

In this case, provision is made, in accordance with an exemplary embodiment according to the present disclosure, for the retaining grooves to serve to interact in each case with the corresponding longitudinal edges of the partially open core profile by the open flanks of the web elements which form the core profile in each case engaging in the retaining grooves which are provided for this purpose.

According to an exemplary embodiment of the present disclosure, provision is further made for the retaining profile to be in the form of a web which extends in the longitudinal direction. Integrally formed portions which are symmetrical in relation to one another are arranged on the two longitudinal edges of the retaining profile, and the symmetrical integrally formed portions in each case point towards the same side.

These integrally formed portions which are arranged on one side, that is, the same side, of the web are in each case adapted in terms of shape for the purpose of engaging in an interlocking manner in the adjacent core profiles of two frames which directly adjoin one another and, as a result, serve to connect the two frames to one another in an interlocking manner.

To this end, the correspondingly shaped retaining profile can have a cross section which resembles the letter "B", with there being a certain spacing between the two "convexities". The two web elements, which run parallel to one another, of the adjoining core profiles of two adjacent frames engage in the spacing in the installation position and, as a result, connect the frames in an interlocking manner.

An exemplary embodiment of the present disclosure also takes into consideration the fact that the space in switchgear cabinets which are formed by one or by two frames is not sufficient to accommodate the required electrical equipment, but rather that four frames have to be joined to one another.

To this end, provision is made, in accordance with an exemplary embodiment of the present disclosure, for two retaining profiles to be permanently connected to one another at their webs which face one another, with a certain spacing likewise being maintained between the webs. The web elements, which run parallel to one another, of the adjoining core profiles of two adjacent frames and also of the two frames which are arranged above them engage in the spacing.

An electrical switchgear cabinet according to the present disclosure therefore provides that the design of each frame corner is intended to be accordingly set up to connect physically identical switchgear cabinets to one another at the sides and/or at the top or at the bottom by means of a plug-type connection which is formed by one or more retaining profiles which can be inserted into the relevant connecting profile.

Furthermore, the design of each frame corner also provides the option of fixing a base to the relevant switchgear cabinet by using a retaining profile which can be inserted into the relevant connecting profile.

In accordance with an exemplary embodiment of the electrical switchgear cabinet according to the present disclosure, provision is further made for the visible region of each frame corner to be covered by means of a metal and/or plastic profile strip which can be colored if desired. The profile strip can be either a composite structure comprising metal and plastic or appropriately shaped coverings which are of the same color as the housing of the switchgear cabinet or have a color which contrasts with the color of the housing of the switchgear cabinet.

Exemplary embodiments of the present disclosure also provide a connecting profile or switchgear cabinet connecting profile for connecting at least two switchgear cabinets in a force-fitting manner. In accordance an exemplary embodiment, the connecting profile can be of a multi-part design and have a core profile and a covering profile and/or a retaining profile and/or at least one cap which can be fitted to a profile end, with the core profile serving for anchoring to the frame or to the frame corner of the respective switchgear cabinet, and the covering and/or retaining profile serving for connecting two core profiles, and therefore also the respective switchgear cabinets, in a force-fitting manner.

In accordance with an exemplary embodiment of the present disclosure, the core profile is of a partially open design, with the cross section of the core profile having the basic shape of a rectangle, for example, a square, with rounded corners. One corner from among the corners and flanks which adjoin the one corner are removed in each case at least as far as to half the edge length of the square in such a way that the square is open in this case and therefore the core profile is also open along its longitudinal axis.

In the state in which the core profile is installed in the corner profile of the switchgear cabinet frame, provision can also be made for the open corner of the core profile to point outwards in the direction of the diagonal of the respective frame, so that the open region forms the corner termination of the frame which is provided with the corner profile.

In accordance with an exemplary embodiment of the present disclosure, the covering or retaining profile can be mounted on the core profile, so that the covering or retaining profile can be connected to the core profile in an interlocking and possibly force-fitting manner by means of sliding, positioning or plugging or clipping, for example. The covering or retaining profile, in its intended installation position, terminates flush with the surface of the respective side wall part or cover or base wall part.

In order to avoid repetition, for further explanation of the switchgear cabinet connecting profile, reference is made to the above statements regarding the switchgear cabinet according to exemplary embodiments of the present disclosure and the connecting profile which is described in this respect.

These and further advantageous refinements of and improvements to the present disclosure are explained in greater detail below with reference to exemplary embodiments illustrated in the drawings.

Figure 1:
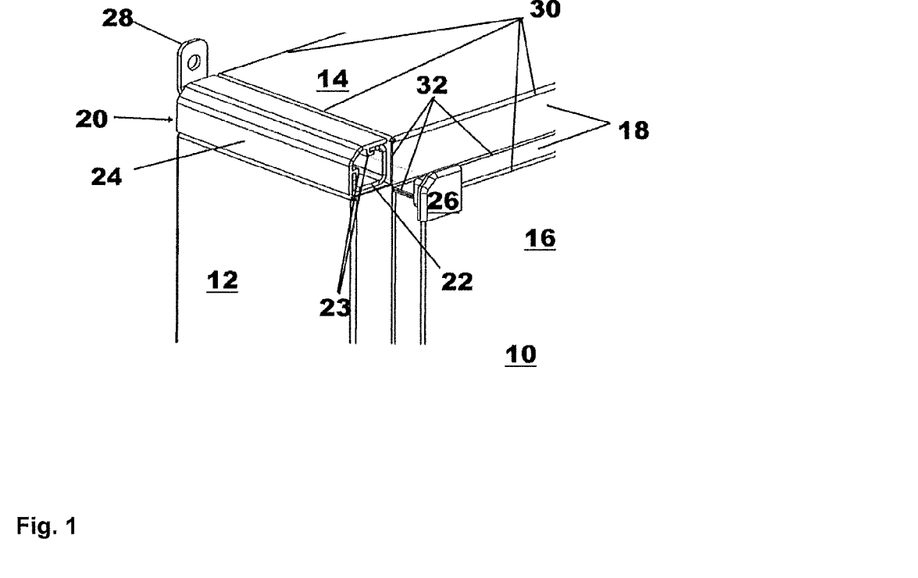
FIG. 1 shows an illustration of a frame corner of an electrical switchgear cabinet having attachment parts according to an exemplary embodiment of the present disclosure.

FIG. 1 shows an illustration of a frame corner of an electrical switchgear cabinet 10 having attachment parts 20, 28 according to an exemplary embodiment of the present disclosure. The switchgear cabinet 10 can be in the form of a frame which is in each case composed of two side wall parts 12, a cover wall part 14 and an identical base wall part. If desired, the switchgear cabinet 10 can also be provided with a front face 16.

In accordance with an exemplary embodiment, the frame can be manufactured from sheet metal. In this case, it is possible for the individual wall parts to be prefabricated. In accordance with an exemplary embodiment, the individual wall parts of the frame can be welded to one another. However, according to an exemplary embodiment of the present disclosure, it is also possible for the switchgear cabinet to be manufactured from a plastic, with the wall parts being individually prefabricated and then joined (e.g., integrally) to one another in this case. The following description of an exemplary embodiment refers to a switchgear cabinet which is manufactured from sheet metal. However, it is to be understood that the present disclosure is not limited to such a sheet metal construction.

In order to provide the requisite rigidity of the housing, and also on account of the external appearance, the wall parts are in each case provided with an angle 18, which can be formed, for example, by means of bending out of the wall part, at their longitudinal ends and also at the longitudinal face which points towards the front face in the installed position.

In this case, correspondingly dimensioned sheet metal tabs are angled along a bending line 30 out of the sheet metal which is provided in each case to manufacture the relevant wall part and are connected to one another at the angled edges 32 by means of welding to an adjacent wall part and, in this way, form a frame corner which is filled with a connecting profile 20 as an attachment part. In accordance with an exemplary embodiment, the respectively abutting edges 32 can be welded to one another by means of laser welding, for example.

Figure 3:
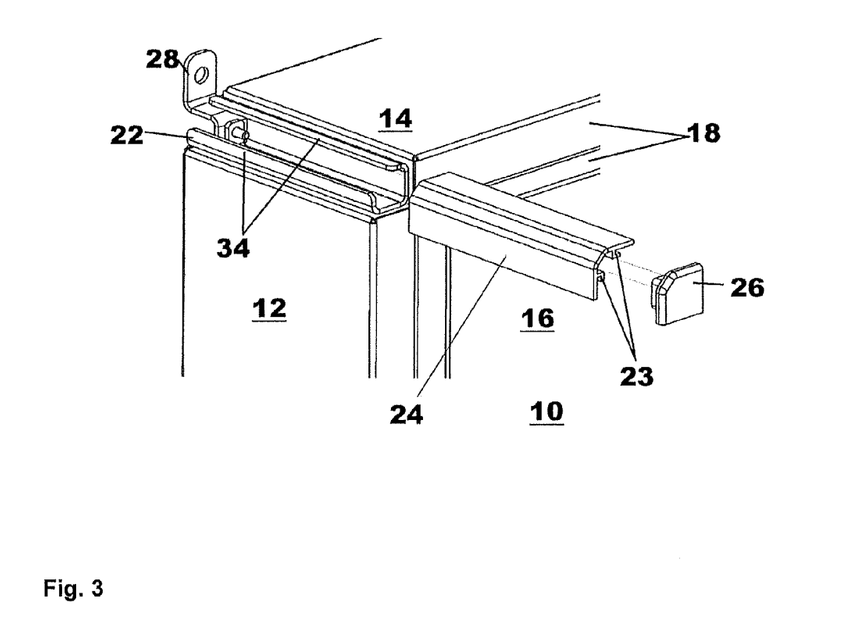
FIG. 3 shows an illustration of a frame corner of an electrical switchgear cabinet with an illustration of the installation of the attachment parts according to an exemplary embodiment of the present disclosure.

FIG. 1 also shows that the connecting profile 20 includes a core profile 22 which is in the form of a partially open square hollow profile from which one corner region is removed. The core profile 22 is covered by means of a covering profile 24 which can be connected to, for example, pushed onto, as indicated in FIG. 3, or positioned on or plug-connected to, the core profile 22 in an interlocking and/or force-fitting manner. The covering profile 24 is provided, on its inner face as can be seen in FIG. 1, with L-shaped angles which form grooves 23 which run in opposite directions and serve as retaining grooves for the purpose of connecting the covering profile 24 to the core profile 22. The entire arrangement is terminated with a termination cap 26 which is plugged onto the end face of the core profile 22.

Figure 4:
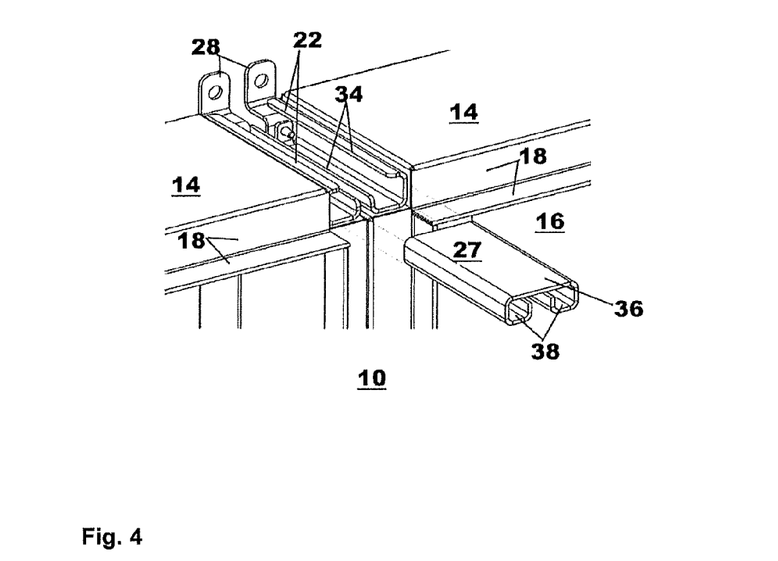
FIG. 4 shows an illustration of a respective frame corner of two electrical switchgear cabinets which are arranged next to one another and have attachment parts according to an exemplary embodiment of the present disclosure.

In addition, a retaining clip 28 which serves to fasten the electrical switchgear cabinet 10 to the wall is provided on each wall-side end of the frame corner. As shown in FIG. 3 and FIG. 4, for example, the position of the retaining clip 28 can be adjusted by means of a screw, for example.

Figure 2:
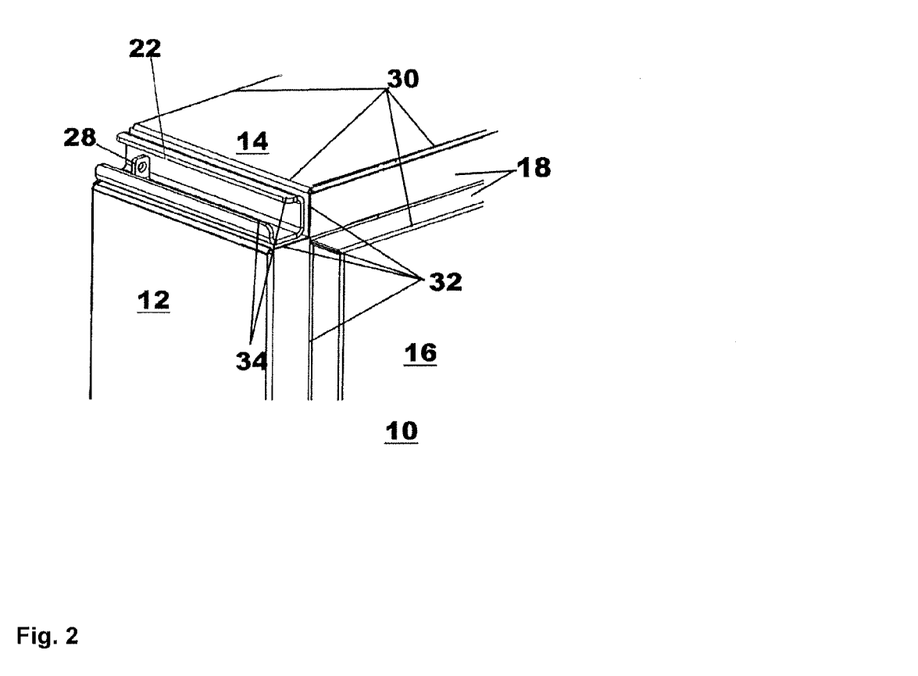
FIG. 2 shows an illustration of a frame corner of an electrical switchgear cabinet having attachment parts according to an exemplary embodiment of the present disclosure.

FIG. 2 shows an illustration of an exemplary embodiment of a frame corner of an electrical switchgear cabinet 10 having attachment parts 20 in an earlier manufacturing stage than that illustrated in FIG. 1, in which the partially open core profile 22, by way of its free web elements 34, and also a retaining clip 28 are already fitted to the frame, but the covering profile 24 and the termination cap 26 are not. All the other features of the disclosure are already illustrated in FIG. 1 and explained in the associated description.

FIG. 3 shows an illustration of an exemplary embodiment of a frame corner of an electrical switchgear cabinet with the function and the purpose of the individual features already having been explained in the description of FIGS. 1 and 2 and, in this respect, this information extending to FIG. 3 too.

Therefore, it is clear from FIG. 3 that, when the covering profile 24 is pushed onto the core profile 22, the covering profile 24 is connected to the core profile 22 by means of the web elements 34 which are arranged on the core profile 22 and engage in the retaining grooves 23 which are integrally formed on the inner face of the covering profile 24.

FIG. 4 shows an illustration of an exemplary embodiment of a respective frame corner of two electrical switchgear cabinets 10 which are arranged immediately next to one another and which can be connected to one another in an interlocking manner by means of a retaining profile 27 which can be pushed on.

The retaining profile 27 is formed from a web 36 which is composed of planar flat material. A respective convex integrally formed portion 38 is provided at the two longitudinal edges of the web. The convex integrally formed portions are symmetrical in relation to one another and in each case are provided for engaging in an interlocking manner in the adjacent core profiles 22 of two immediately adjoining frames of switchgear cabinets 10 according to the present disclosure. As a result, connecting the frames can be connected to one another in an interlocking manner. In this case, the web 36, which runs in the longitudinal direction and has the integrally formed portions 38 which are symmetrical in relation to one another, has a cross-sectional shape which resembles the letter "B".

Figure 5:
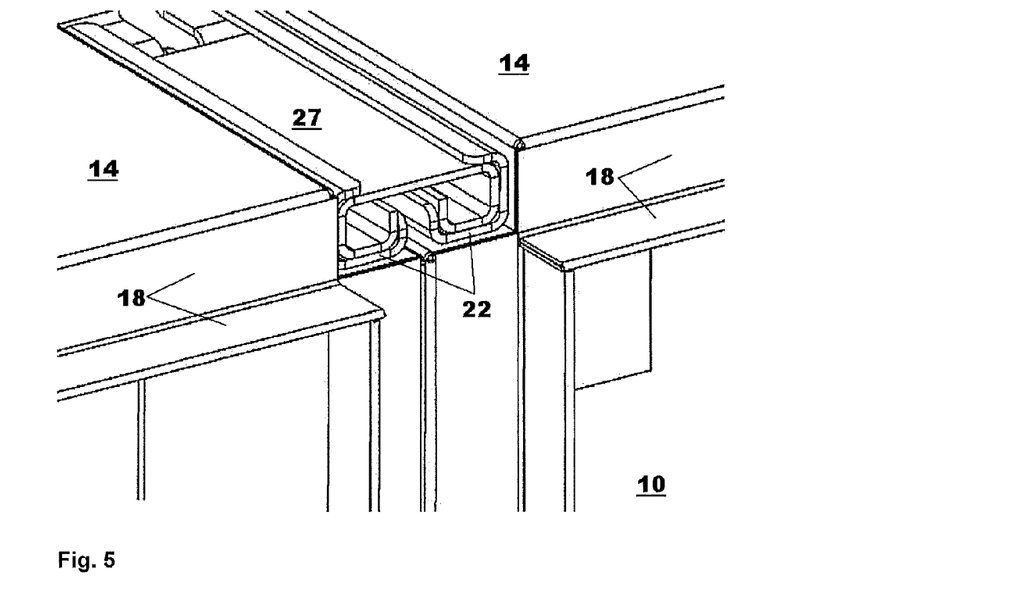
FIG. 5 shows the illustration according to FIG. 4 with the retaining profile inserted.

FIG. 5 shows the arrangement according to FIG. 4 but with the retaining profile 27 inserted into the core profile 22 of each frame corner and connecting the frames or switchgear cabinets 10, which are arranged next to one another, to one another in an interlocking manner.

Figure 6:
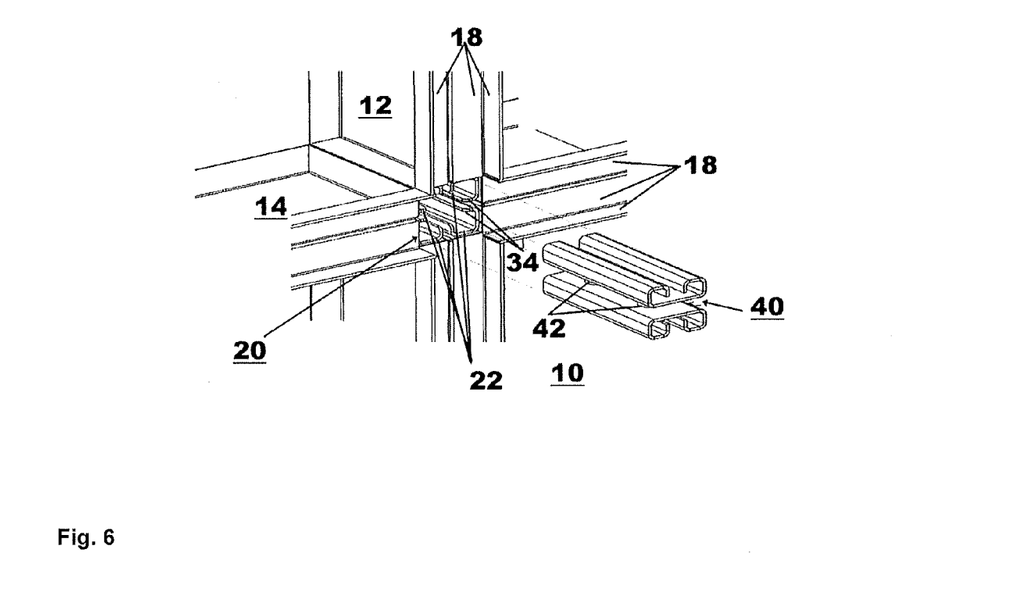
FIG. 6 shows an illustration of a respective frame corner of a first pair of electrical switchgear cabinets which are arranged next to one another as well as two further electrical switchgear cabinets which are arranged above the first pair switchgear cabinets and which have attachment parts, in accordance with an exemplary embodiment of the present disclosure.

FIG. 6 shows an illustration of an exemplary embodiment of a respective frame corner of two electrical switchgear cabinets 10 according to the present disclosure which are arranged immediately next to one another and also two further electrical switchgear cabinets 10 according to the present disclosure which are arranged above the first two switchgear cabinets and are likewise immediately adjacent to one another and which are likewise connected to one another in an interlocking manner with the aid of a retaining profile 40.

The retaining profile 40 is composed of two retaining profiles 27 which are shown in FIGS. 4 and 5 and face one another by way of their web face 36 and are connected to one another at a distance from one another by means of retaining elements 42. The retaining elements 42 can accordingly be, for example, a screw or rivet connections or spot-welds which are kept at a distance and exactly define the intended position of the two individual parts of the retaining profile 40.

Therefore, the present disclosure makes it possible to connect a plurality of switchgear cabinets in an efficient manner using a connecting profile by a simple plug-connection. It is to be understood that it is not important here whether the respective cabinets are connected vertically or horizontally since both variant embodiments can be formed and/or realized, even in combination. On account of the special design of the respective corner region of the respective switchgear cabinet, it is also possible to connect a base on the cabinet or to the cabinet in the same way. It is likewise feasible for a wall fastening tab to be screwed into the respective corner region.

The present disclosure also covers any desired combinations of exemplary embodiments and also individual refinement features or developments, provided that these are not mutually exclusive.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Electrical switchgear cabinet
12 Side wall part
14 Cover or base wall part
16 Front face
18 Angle
20 Connecting profile
22 Core profile
23 Retaining groove
24 Covering profile
26 Termination cap
27 Retaining profile
28 Retaining clip
30 Bending edge
32 Welding edge
34 Web element
36 Web
38 Integrally formed portion (convexity)
40 Retaining profile
42 Retaining element

What is claimed is:

1. An electrical switchgear cabinet comprising:
two side wall parts; and
at least one of a cover wall part and a base wall part;
wherein the side wall parts and the at least one of the cover wall part and base wall part are connected to one another, and form a rectangular frame which is configured to be connected to a rear face and to a front face,
wherein each side wall part and each at least one of the cover wall part and base wall part form an approximate rectangular shape, outer edges of each side wall part and each at least one of the cover wall part and base wall part being angled to support connection thereof, and
wherein the angled edges are integrally connected to one another at abutment points with adjacent angled outer edges and form a corner profile at each frame corner, such that a connecting profile is connectable to the corner profile, each of the angled edges terminating at an outer end which projects in a direction perpendicular to the corresponding wall part from which the angled edges extend.

2. The electrical switchgear cabinet according to claim 1, wherein the connecting profile, which is arranged at each frame corner, which is formed by one of the side wall parts with one of the cover wall part and the base wall part, forms a visible connection with the corresponding adjacent wall parts of the frame corner.

3. The electrical switchgear cabinet according to claim 2, wherein the connecting profile, which is configured to be mounted in the corner profile, has several parts.

4. The electrical switchgear cabinet according to claim 3, wherein the connecting profile is formed by at least one of a core profile a covering profile, and at least one termination cap which is configured to be fitted at an end of the at least one of the core profile and the covering profile.

5. The electrical switchgear cabinet according to claim 4, wherein the connecting profile is formed by a core profile, and
wherein the core profile of each connecting profile is of an identical design.

6. The electrical switchgear cabinet according to claim 4, wherein the connecting profile is formed by a core profile, and
wherein the core profile is of a partially open design, with one corner region of the core profile being removed and open flanks of the core profile forming web elements.

7. The electrical switchgear cabinet according to claim 4, wherein the covering profile is configured to be mounted on the core profile, and terminate flush with a surface of at least one of the respective side wall part and the at least one of the cover wall part and the base wall part.

8. The electrical switchgear cabinet according to claim 1, wherein the connecting profile, which is configured to be mounted in the corner profile, has several parts.

9. The electrical switchgear cabinet according to claim 8, wherein the connecting profile is formed by at least one of a core profile, and a covering profile, and at least one termination cap which is configured to be fitted at an end of the at least one of the core profile and the covering profile.

10. The electrical switchgear cabinet according to claim 9, wherein the connecting profile is formed by a core profile, and
wherein the core profile of each connecting profile is of an identical design.

11. The electrical switchgear cabinet according to claim 9, wherein the connecting profile is formed by a core profile, and
wherein the core profile is of a partially open design, with one corner region of the core profile being removed and open flanks of the core profile forming web elements.

12. The electrical switchgear cabinet according to claim 9, wherein the covering profile is configured to be mounted on the core profile, and terminate flush with a surface of at least one of the respective side wall part and the at least one of the cover wall part and the base wall part.

13. The electrical switchgear cabinet according to claim 9, wherein the profile is in the form of a web which runs in the longitudinal direction, a convex integrally formed portion being provided on the two longitudinal edges of the profile in each case, the convex integrally formed portions being symmetrical in relation to one another and in each case being configured to engage in an interlocking manner in the adjacent core profiles of two directly adjoining frames and connecting the frames to one another in an interlocking manner.

14. The electrical switchgear cabinet according to claim 13, wherein the web which runs in the longitudinal direction and has the integrally formed portions which are symmetrical to one another has a cross-sectional shape which resembles the letter "B".

15. The electrical switchgear cabinet according to claim 13, comprising:
a further retaining profile formed by two retaining profiles being permanently connected to one another at their webs which face one another, wherein:
a predetermined spacing is maintained between the webs, one corner region of the core profile is removed and open flanks of the core profile form web elements;
the web elements, which run parallel to one another, of the adjoining core profiles of a first two adjacent frames and also of a second two frames which are arranged above the first two frame are configured to engage in the spacing.

16. The electrical switchgear cabinet according to claim 9, comprising:
a further retaining profile formed by two retaining profiles being permanently connected to one another at their webs which face one another, wherein:
a predetermined spacing is maintained between the webs, one corner region of the core profile is removed and open flanks of the core profile form web elements;
the web elements, which run parallel to one another, of the adjoining core profiles of a first two adjacent frames and also of a second two frames which are arranged above the first two frame are configured to engage in the spacing.

17. The electrical switchgear cabinet according to claim 9, wherein the connecting profile is formed by a retaining profile.

18. The electrical switchgear cabinet according to claim 1, wherein each frame corner is configured to connect physically identical switchgear cabinets to one another at at least one of the sides, the top and the bottom by means of a plug-type connection which is formed by a retaining profile which is insertable into the corresponding connecting profile.

19. The electrical switchgear cabinet according to claim 1, wherein each frame corner is configured to fix a base to the a corresponding switchgear cabinet by using a retaining profile which is insertable into the corresponding connecting profile.

20. The electrical switchgear cabinet according to claim 1, wherein the visible region of each frame corner is configured to be covered by at least one of a metal profile strip and a plastic profile strip.

21. The electrical switchgear cabinet according to claim 20, wherein the at least one of the metal profile strip and the plastic profile strip are colorable.

22. The electrical switchgear cabinet according to claim 1, wherein the two side wall parts and the at least one of the cover wall part and the base wall part are integrally connected to one another.

23. The electrical switchgear cabinet according to claim 22, wherein the two side wall parts and the at least one of the cover wall part and the base wall part are welded to one another.

24. An electrical switchgear cabinet comprising:
two side wall parts; and
at least one of a cover wall part and a base wall part;
wherein the side wall parts and the at least one of the cover wall part and base wall part are connected to one another, and form a rectangular frame which is configured to be connected to a rear face and to a front face,
wherein each side wall part and each at least one of the cover wall part and base wall part form an approximate rectangular shape, outer edges of each side wall part and each at least one of the cover wall part and base wall part being angled to support connection thereof, and
wherein the angled edges are integrally connected to one another at abutment points with adjacent angled outer edges and form a corner profile at each frame corner, such that a connecting profile is connectable to the corner profile,
wherein the connecting profile, which is configured to be mounted in the corner profile, has several parts,
wherein the connecting profile is formed by at least one of a core profile, and a covering profile, and at least one termination cap which is configured to be fitted at an end of the at least one of the core profile and the covering profile,
wherein the covering profile is configured to be mounted on the core profile, and terminate flush with a surface of at least one of the respective side wall part and the at least one of the cover wall part and the base wall part, and
wherein each covering profile includes two longitudinal edges which run in the longitudinal direction and are arranged orthogonally relative to one another, a connecting web which runs in the longitudinal direction adjoining the longitudinal edges in each case at an angle of less than about 90° to form an angular profile, and two retaining grooves which run in the longitudinal direction being integrally formed on an inner face of the angular profile.

25. The electrical switchgear cabinet according to claim 24, wherein the retaining grooves are configured to interact in each case with the corresponding web elements of the partially open core profile.

26. An electrical switchgear cabinet comprising:
two side wall parts; and
at least one of a cover wall part and a base wall part;
wherein the side wall parts and the at least one of the cover wall part and base wall part are connected to one another, and form a rectangular frame which is configured to be connected to a rear face and to a front face,
wherein each side wall part and each at least one of the cover wall part and base wall part form an approximate rectangular shape, outer edges of each side wall part and each at least one of the cover wall part and base wall part being angled to support connection thereof, and
wherein the angled edges are integrally connected to one another at abutment points with adjacent angled outer edges and form a corner profile at each frame corner, such that a connecting profile is connectable to the corner profile,
wherein the connecting profile, which is arranged at each frame corner, which is formed by one of the side wall parts with one of the cover wall part and the base wall part, forms a visible connection with the corresponding adjacent wall parts of the frame corner, wherein the connecting profile, which is configured to be mounted in the corner profile, has several parts, wherein the connecting profile is formed by a core profile, wherein the core profile of each connecting profile is of an identical design, wherein the covering profile is configured to be mounted on the core profile, and terminate flush with a surface of at least one of the respective side wall part and the at least one of the cover wall part and the base wall part, and wherein each covering profile includes two longitudinal edges which run in the longitudinal direction and are arranged orthogonally relative to one another, a connecting web which runs in the longitudinal direction adjoining the longitudinal edges in each case at an angle of less than about 90° to form an angular profile, and two retaining grooves which run in the longitudinal direction being integrally formed on an inner face of the angular profile.

27. The electrical switchgear cabinet according to claim 26, wherein the retaining grooves are configured to interact in each case with the corresponding web elements of the partially open core profile.

28. The electrical switchgear cabinet according to claim 27, wherein each frame corner is configured to connect physically identical switchgear cabinets to one another at at least one of the sides, the top and the bottom by means of a plug-type connection which is formed by a retaining profile which is insertable into the corresponding connecting profile.

29. The electrical switchgear cabinet according to claim 27, wherein each frame corner is configured to fix a base to the corresponding switchgear cabinet by using a retaining profile which is insertable into the corresponding connecting profile.

30. The electrical switchgear cabinet according to claim 27, wherein the visible region of each frame corner is configured to be covered by at least one of a metal profile strip and a plastic profile strip.

* * * * *